United States Patent
Torres et al.

(10) Patent No.: US 11,704,602 B2
(45) Date of Patent: Jul. 18, 2023

(54) METHOD FOR SERVING PARAMETER EFFICIENT NLP MODELS THROUGH ADAPTIVE ARCHITECTURES

(71) Applicant: Intuit Inc., Mountain View, CA (US)

(72) Inventors: Terrence J. Torres, Mountain View, CA (US); Tharathorn Rimchala, San Francisco, CA (US); Andrew Mattarella-Micke, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 730 days.

(21) Appl. No.: 16/732,869

(22) Filed: Jan. 2, 2020

(65) Prior Publication Data

US 2021/0209513 A1 Jul. 8, 2021

(51) Int. Cl.
*G06F 40/126* (2020.01)
*G06N 20/20* (2019.01)
*G06F 40/284* (2020.01)

(52) U.S. Cl.
CPC .......... *G06N 20/20* (2019.01); *G06F 40/126* (2020.01); *G06F 40/284* (2020.01)

(58) Field of Classification Search
None
See application file for complete search history.

(56) References Cited

U.S. PATENT DOCUMENTS

| | | | |
|---|---|---|---|
| 10,957,307 B2* | 3/2021 | Polovets | G06N 3/044 |
| 2018/0253209 A1* | 9/2018 | Jaygarl | G06F 3/0488 |
| 2019/0197109 A1* | 6/2019 | Peters | G06F 40/30 |
| 2020/0104369 A1* | 4/2020 | Bellegarda | G06F 40/30 |
| 2020/0257963 A1* | 8/2020 | Abhinav | G06N 3/0445 |
| 2021/0182662 A1* | 6/2021 | Lai | G06F 40/284 |

OTHER PUBLICATIONS

International Search Report dated Oct. 7, 2020 dated PCT/US2020/040398.
Written Opinion dated Oct. 7, 2020 issued in PCT/US2020/040398.
Houlsby et al. "Parameter-Efficient Transfer Learning for NLP", Cornell University Library, Feb. 2, 2019, 13 pages.
Strickland et al. "BERT and PALS: Projected Attention Layers for Efficient Adaptation in Multi-Task Learning", Cornell University Library, Feb. 7, 2019, 11 pages.

* cited by examiner

*Primary Examiner* — Ariel Mercado
(74) *Attorney, Agent, or Firm* — DLA Piper LLP (US)

(57) ABSTRACT

A machine learning system executed by a processor may generate predictions for a variety of natural language processing (NLP) tasks. The machine learning system may include a single deployment implementing a parameter efficient transfer learning architecture. The machine learning system may use adapter layers to dynamically modify a base model to generate a plurality of fine-tuned models. Each fine-tuned model may generate predictions for a specific NLP task. By transferring knowledge from the base model to each fine-tuned model, the ML system achieves a significant reduction in the number of tunable parameters required to generate a fine-tuned NLP model and decreases the fine-tuned model artifact size. Additionally, the ML system reduces training times for fine-tuned NLP models, promotes transfer learning across NLP tasks with lower labeled data volumes, and enables easier and more computationally efficient deployments for multi-task NLP.

18 Claims, 8 Drawing Sheets

METHOD FOR SERVING PARAMETER EFFICIENT NLP MODELS THROUGH ADAPTIVE ARCHITECTURES

DETAILED DESCRIPTION OF SEVERAL EMBODIMENTS

Natural language processing (NLP) comprises a set of quickly evolving machine learning technologies aimed at understanding unstructured information within written text. A variety of NLP models (e.g., machine learning models for sentiment analysis, topic and intent classification, named entity recognition, and the like) help automate tedious document and text processing jobs that are common to many fields. For example, machine learning models for named entity recognition can be used to automate information extraction from documents and other aspects of document processing. Machine learning models trained to perform other types of NLP tasks can be leveraged for still more types of jobs. Such jobs may include automatically identifying user sentiment from reviews, retrieving highly relevant content from articles, summarizing lengthy documents into shorter segments, or even translating one language into another.

Automation enabled by machine learning greatly improves the speed and efficiency of NLP tasks relative to manual methods. Models that perform NLP tasks also have the capacity to improve overall data quality by eliminating common causes of human error including distraction or fatigue. Additionally, evaluation and remediation of bias can be performed more systematically with NLP models than with human worker pools. However, due to the sophisticated nature of NLP tasks, machine learning systems for performing NLP tasks are often necessarily complex. Machine learning models performing NLP tasks typically include a tremendous number of trainable parameters. To produce a high performing model, each of these parameters is trained using a data intensive and task specific training process. Every time a new model is generated for a different NLP task, the training process must be repeated on a new set of parameters.

Disclosed herein are systems and methods for providing a variety of NLP models using a parameter efficient transfer learning architecture. NLP models are typically large files that are each non-generalizable and specific to one NLP task. Therefore, generating predictions for a variety of NLP tasks typically requires maintaining a series of monolithic, task specific models. This series of task specific models requires a substantial compute infrastructure for each model that must be constantly maintained even during downtime when one or more models are not in use. The Adapter Service architecture described herein integrates NLP task specific adapter layers into a single base model instance to efficiently generate a variety of NLP models that can perform a wide range of NLP tasks. Transfer learning enabled by the Adapter Service architecture improves the efficiency of the model training process. Relative to training an entire base model for each NLP task, the Adapter Service architecture implements task specific adapter layers. The adapter layers have a reduced number of trainable parameters and require less data, time, and processing capacity to train. To perform a wide variety of NLP tasks, task specific adapter layers may be integrated into a base model on demand. It is empirically observed that models incorporating one or more adapter layers trained and inferenced with various embodiments of the Adapter Service architecture have a comparable performance relative to monolithic, task specific base models having full sets of trainable parameters.

By reducing the number of trainable parameters, the volume of training data, and the amount of training time and resources, transfer learning with the adapter layers may improve machine learning based methods of NLP. In particular, transfer learning with the adapter layers reduces the amount of training data and computational resources required to train an NLP model. By reducing the number of trainable parameters, transfer learning with the adapter layers also reduces the amount of time spent tuning the model parameters to generate a task specific model that performs well on out-of-sample predictions.

Figure 1:
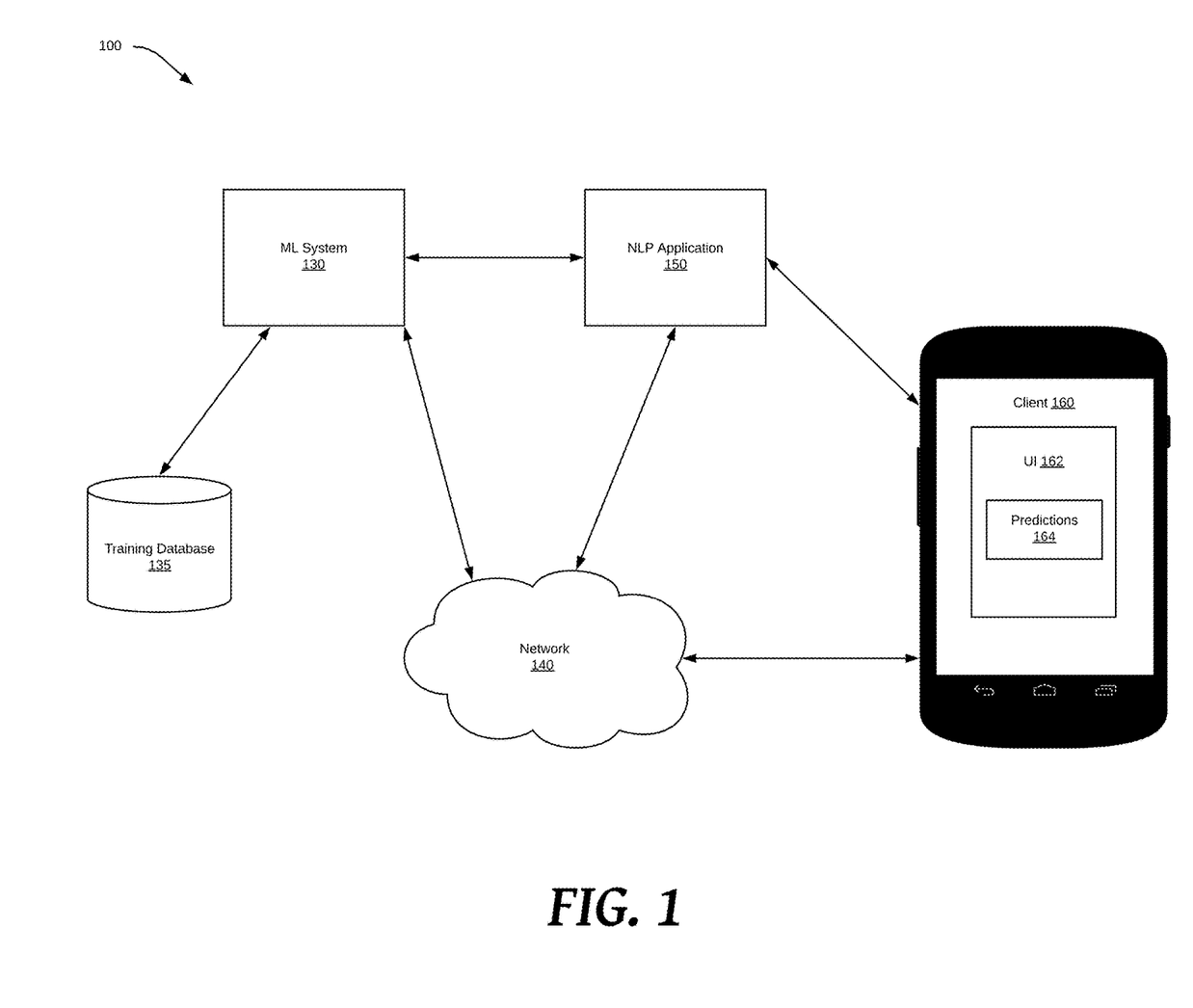
FIG. 1 shows a system for serving NLP models according to various embodiments of the present disclosure.
Figure 7:
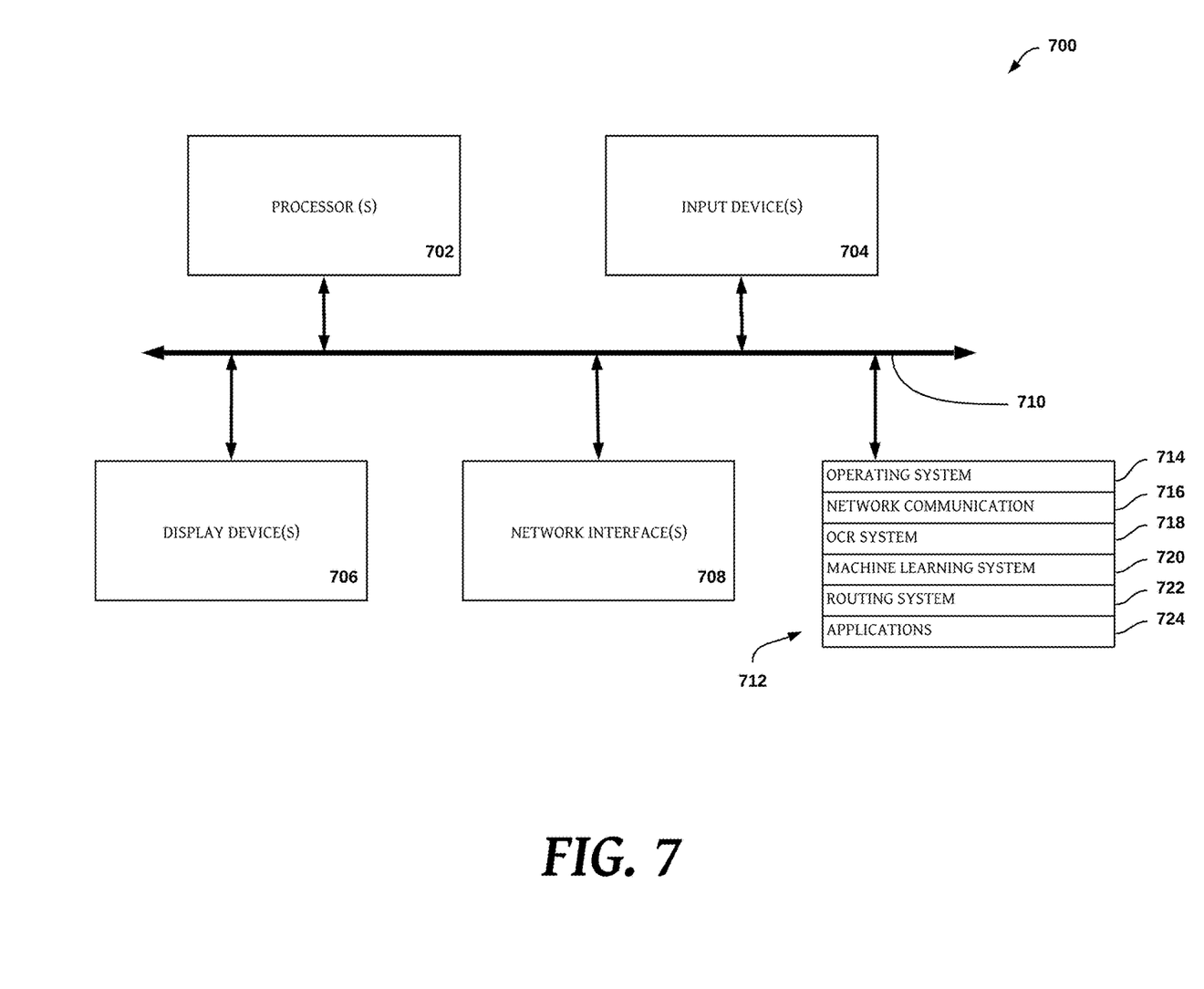
FIG. 7 shows a computing device according to various embodiments of the present disclosure.

FIG. 1 shows a system for serving NLP models 100 according to various embodiments of the present disclosure. System 100 may include a plurality of functional elements that may be provided by one or more computing devices (e.g., one or more computing devices 700 as shown in FIG. 7). These elements may work together to automatically route prediction requests, configure ML systems, serve NLP models, and/or generate NLP predictions.

For example, system 100 may include at least one client 160. Client 160 may be any device configured to present UIs 162 including one or more NLP predictions 164 and receive inputs thereto in the UIs 162. For example, client 160 may be a smartphone, personal computer, tablet, laptop computer, or other device.

System 100 may include an NLP application instance 150. In some embodiments, NLP application 150 may be a hardware and/or software component of client 160. In some embodiments, NLP application 150 may be a hardware and/or software component accessible to client 160 through network 140 (e.g., an application hosted by an application server or other server computer). As described in greater detail below, NLP application 150 may use NLP predictions 164 generated by the ML System 130 to provide NLP functionality and/or one or more higher level features. Such NLP functionality may include and/or be based on an NLP task such as sentiment analysis, named entity recognition, topic classification, intent classification, document classification, and the like. The NLP application 150 may provide NLP predictions 164 to the client 160 directly. The NLP application 150 may also incorporate NLP predictions 164 into NLP functionality or some other higher level output that is provided to the client 164. For example, the NLP application 150 may generate a list of entities (e.g., companies, vendors, products, etc.) included in a collection of documents using NLP predictions 164 generated by an NLP model that performs named entity recognition tasks.

System 100 may include ML system 130, which may be a hardware and/or software component accessible to client 160 through network 140 in some embodiments (e.g., ML system 130 may be hosted by a server computer). As described in greater detail below, ML system 130 may use data from training database 135 and/or other sources to train one or more machine learning models to generate NLP predictions. These predictions may then be distributed to one or more NLP application instances 150.

In some embodiments, one or more of client 160, NLP application instance 150, and/or ML system 130 may communicate with one another through network 140. For example, communication between the elements may be facilitated by one or more application programming interfaces (APIs). APIs of system 100 may be proprietary and/or may be available to those of ordinary skill in the art. Network 140 may be the Internet and/or other public or private networks or combinations thereof.

A single client 160 and separate, single NLP application 150, and/or ML system 130 are shown for ease of illustration, but those of ordinary skill in the art will appreciate that these elements may be embodied in different forms for different implementations. For example, system 100 may include a plurality of clients 160, many of which may access different data. Moreover, single ML system 130, and/or NLP application 150 may each be components of a single computing device (e.g., computing device 700 described below), or a combination of computing devices may provide single ML system 130 and/or NLP application 150. In some embodiments, the operations performed by client 160 and at least one of the separate, single ML system 130 and/or NLP application 150 may be performed on a single device (e.g., without the various components communicating using network 140 and, instead, all being embodied in a single computing device).

Figure 2:
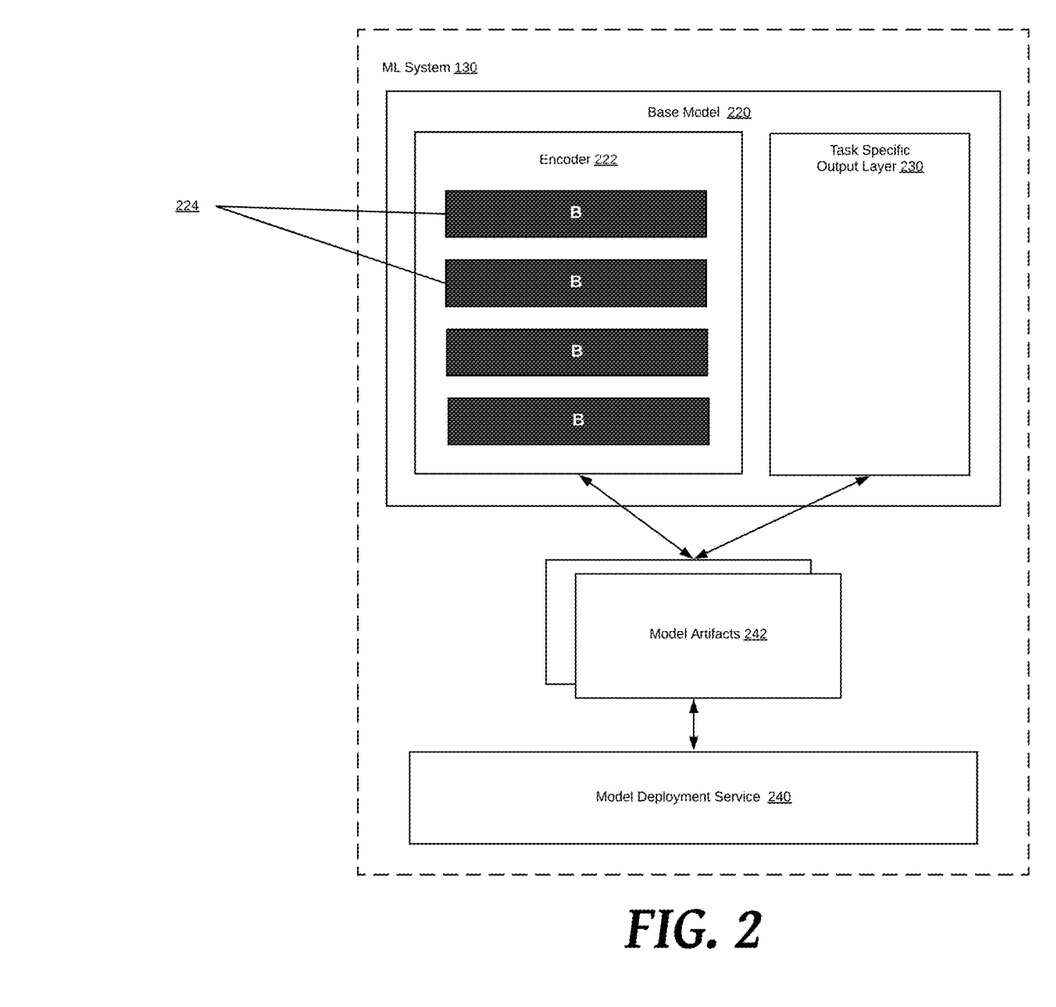
FIG. 2 shows a machine learning system having an Adapter Service architecture according to various embodiments of the present disclosure.
Figure 3:
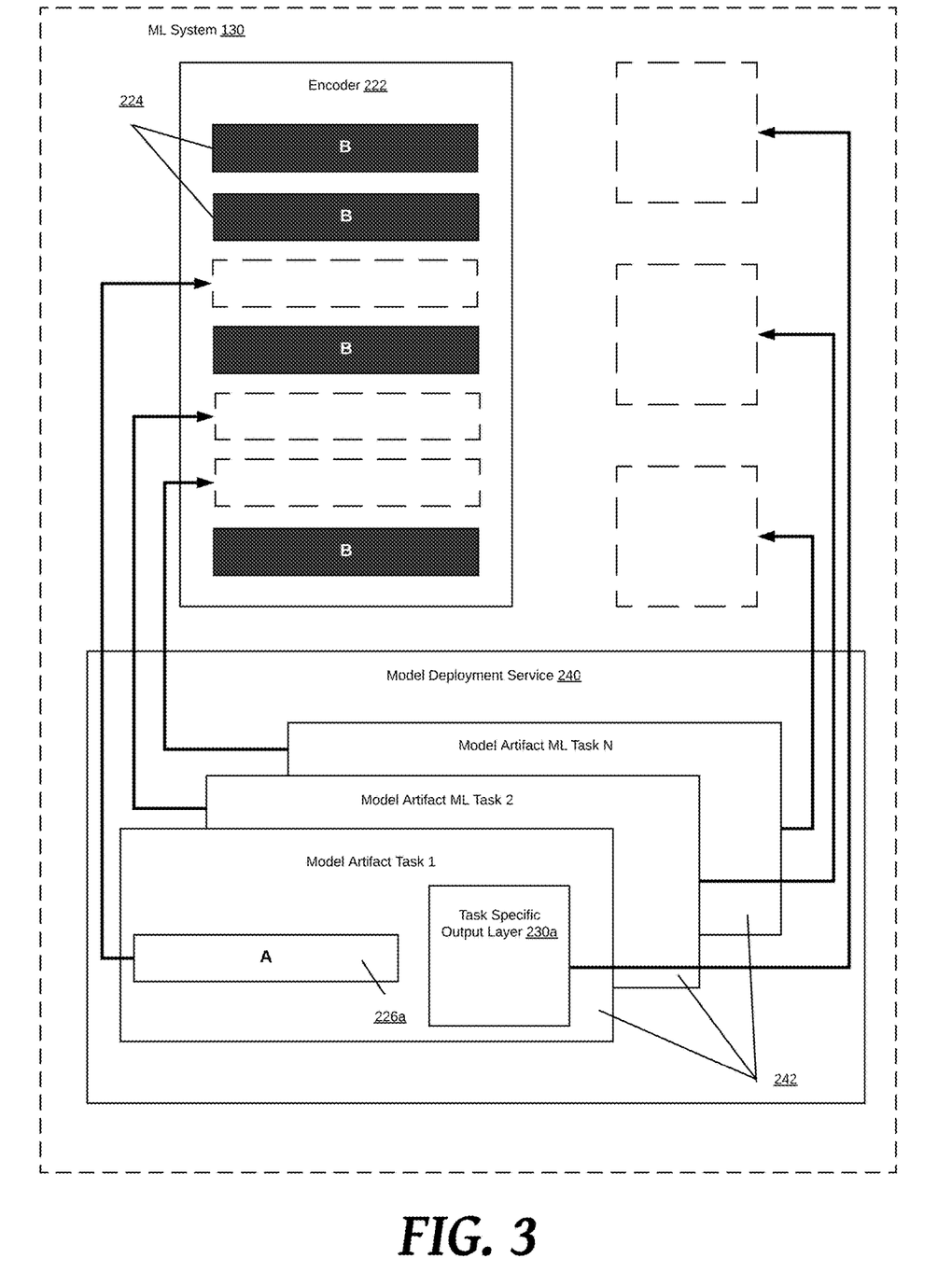
FIG. 3 illustrates more details of a model deployment service included in the Adapter Service architecture according to various embodiments of the present disclosure
Figure 4A:
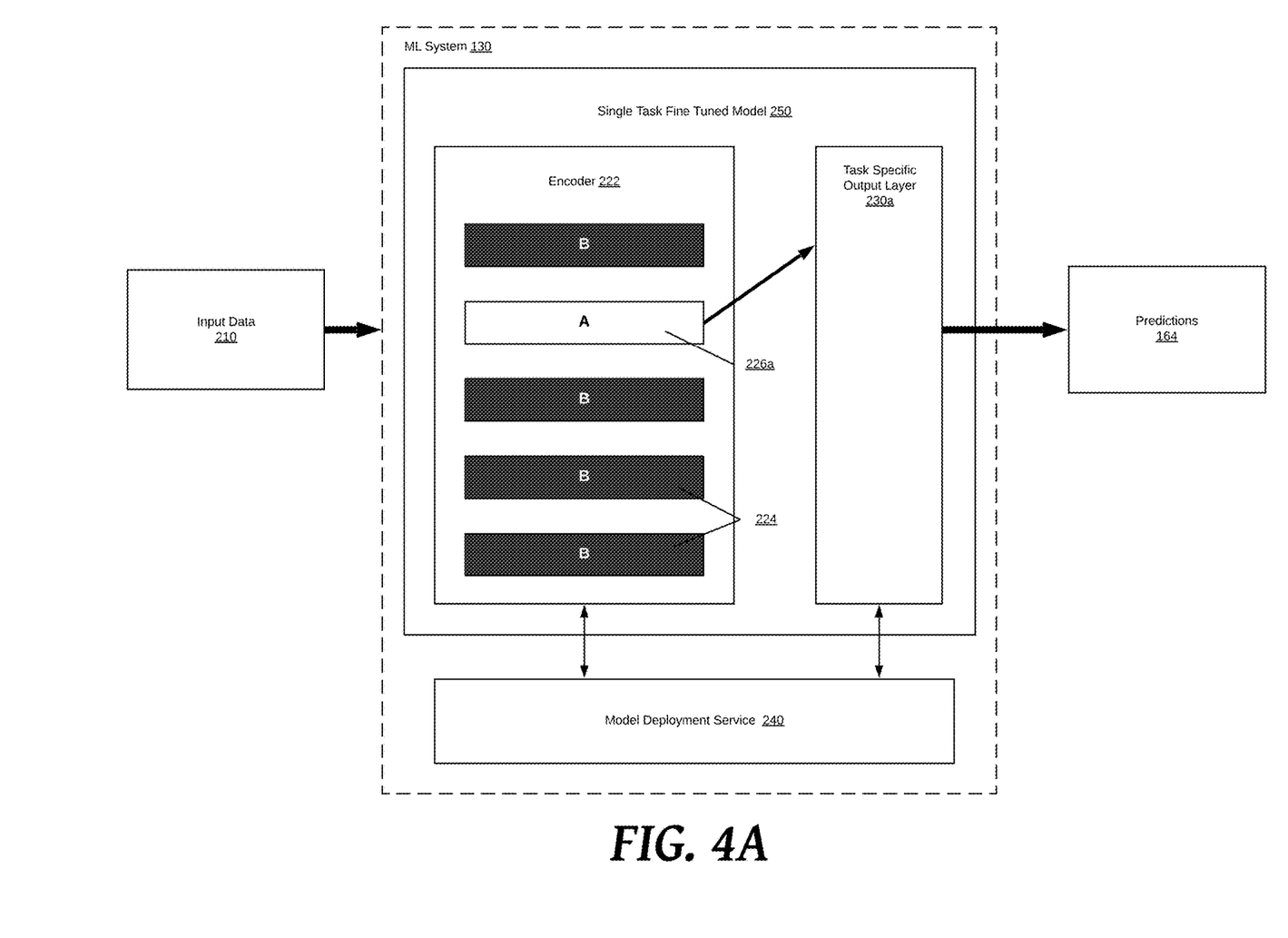
FIG. 4A illustrates a machine learning system having a fine-tuned model that generates predictions according to various embodiments of the present disclosure.
Figure 4B:
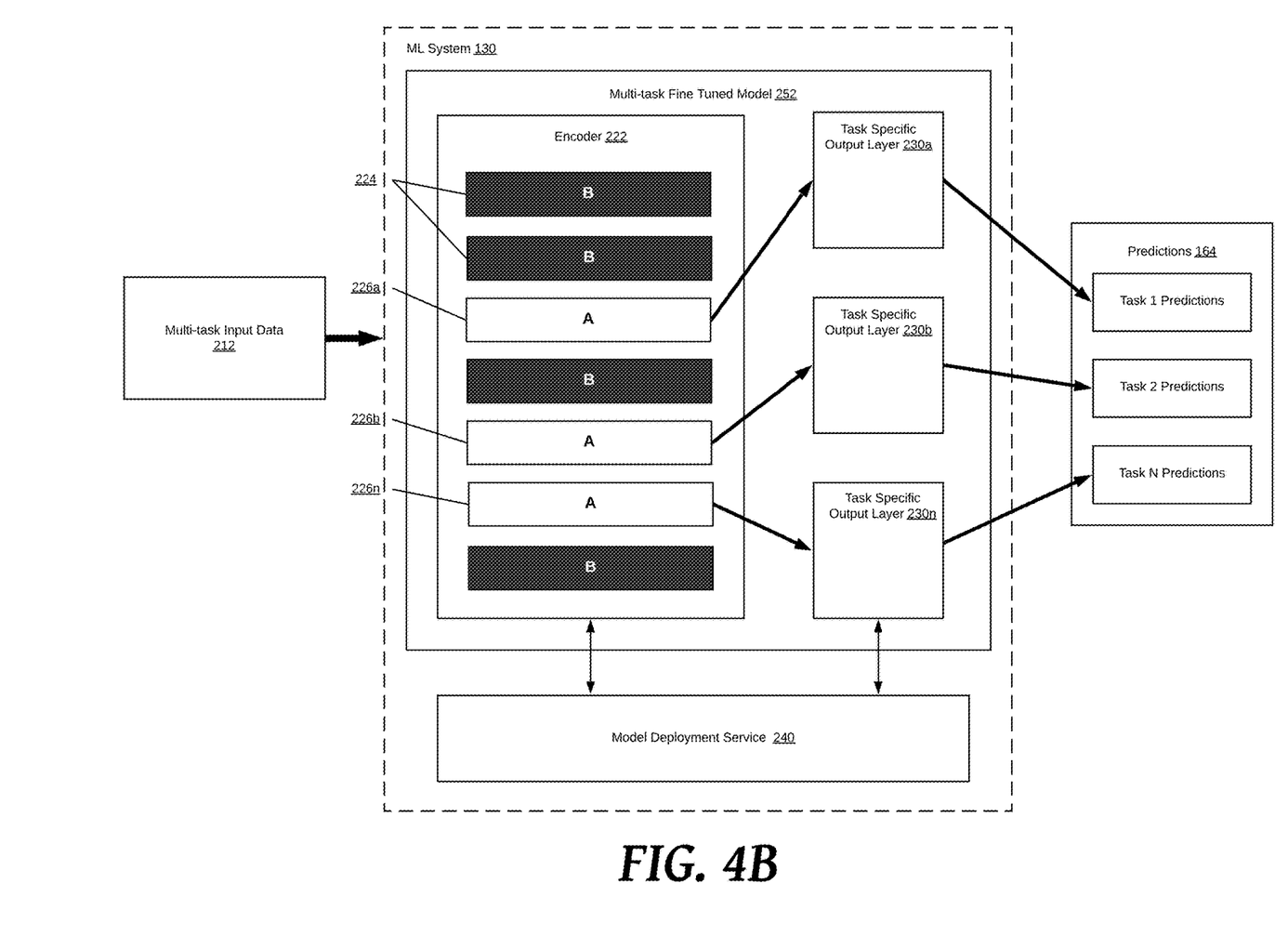
FIG. 4B illustrates a machine learning system having a multi-task fine-tuned model that generates predictions according to various embodiments of the present disclosure.

FIGS. 2-4B show an example ML system 130 according to various embodiments of the disclosure. As shown in FIG. 2, the ML system 130 may serve a variety of NLP applications by integrating one or more light-weight model artifacts 242 into a base model 220 to dynamically adapt the base model 220 to a particular NLP task. FIG. 3 illustrates more details about how the model deployment service 240 integrates one or more Adapter Layers and/or Task Specific Output Layers into the base model 220 to generate a single task fine-tuned model 250 and/or a multi-task fine-tuned model 252. As shown in FIG. 4A, the single task tuned model 250 may ingest input data 210 as input and generate predictions 164 for a single NLP task as output. As shown in FIG. 4B, the multi-task tuned model 252 may ingest multi-task input data 212 including requests for multiple types of NLP predictions as input and generate predictions 164 for multiple NLP tasks as output.

In various embodiments, the ML system 130 includes an Adapter Service architecture. The Adapter Service architecture may be a machine learning system architecture that facilitates generating a plurality of specific models from a single base model instance. The Adapter Service architecture includes a model deployment service 240 and other components that dynamically augment a base model 220 with one or more model artifacts 242. By integrating the one or more model artifacts 242 into a base model 220, the model deployment service 240 generates a plurality of models for performing one or more NLP tasks. Using the Adapter Service architecture, a single deployment of the ML system 130 may dynamically serve a variety of NLP models generating predictions for a wide variety of NLP tasks. As shown in FIG. 4A, to process a request for a sentiment analysis prediction, the model deployment service 240 may load the fine-tuned adapter layer 226a for sentiment analysis into a base model 220. For example, the adapter layer 226a may be loaded into a specific location within the base model 220 encoder 222 to generate a fine-tuned model for sentiment analysis. The specific location for loading the one or more adapter layers 226a may include one or more hidden layers within a base model layers 224. The ML system 130 may then process the sentiment analysis request and output a sentiment analysis prediction. To process a subsequent request for an alternative NLP task, for example, document classification, the ML system 130 may exchange the sentiment analysis adapter layers and output layer for the document classification specific adapter layers and output layers to generate a fine-tuned model for document classification. The ML system 130 may then process the document classification request and output the document classification prediction.

As shown in FIG. 4B, to process requests including multiple types of NLP tasks, the ML system 130 may load multiple output layers 230a-n and/or adapter layers 226a-n into a base model 220 to generate a fine-tuned model for multiple NLP tasks, for example, sentiment analysis, named entity recognition, document classification, and the like. The multi-task fine-tuned model 252 may then generate predictions 164 using each task specific set of adapter layers 226a-n and output layers 230a-n. Predictions 164 for multiple tasks (e.g., task 1, task 2, task N, and the like) output by the ML system 130 are then distributed to one or more instances of an NLP application. In various embodiments, multi-task fine-tuned models 252 may be assembled to reduce the processing time and computational resources required to generate predictions for multiple NLP tasks. For example, multi-task fine-tuned models 252 may load multiple model artifacts 242 in advance to eliminate the processing time required to exchange between task specific adapter layers 226 and/or output layers 230.

A state of the art transfer learning NLP model can be used as a base model 220 that may be augmented with one or more lightweight adapter layers 226a-n. In various embodiments, the adapter layers 226a-n may have a much smaller set of trainable parameters relative to the base model. Training only the small set of parameters included in these adapter layers for a specific NLP task, significantly reduces the number of trainable parameters required to generate an accurate model. Using the Adapter Service architecture described herein, NLP task specific knowledge gained while training the adapter layers may be transferred on demand to the base model to generate accurate NLP predictions for a wide variety of NLP tasks. Transfer learning enabled by the Adapter Service architecture improves the efficiency of the model training process by reducing the number of trainable parameters and training data required to train each adapter layer relative to training an entire task specific base model. It is empirically observed that models incorporating one or more adapter layers trained and inferenced with various embodiments of the Adapter Service architecture have a comparable performance relative to monolithic task specific base models having full sets of trainable parameters.

By reducing the number of trainable parameters, the volume of training data, and the amount of training time and resources, transfer learning with the adapter layers 226a-n may improve machine learning based methods of NLP. In particular, transfer learning with the adapter layers reduces the amount of training data and computational resources required to train an NLP model. By reducing the number of trainable parameters, transfer learning with the adapter layers may also reduce the amount of time spent tuning the model parameters to generate a task specific model that performs well on out-of-sample predictions.

In various embodiments, machine learning models for NLP tasks constitute very large files. These models require a large amount of processing power and memory resources to maintain, update, and load when needed for inference. Robust computational infrastructure may therefore be required to host, maintain, update, and/or serve single task models. Using an Adapter Service architecture may reduce the resources required to generate machine learning models that perform a variety of NLP tasks. The Adapter Service architecture may efficiently generate models that perform a variety of NLP tasks by integrating adapter layers into a single base model instance. In various embodiments, the Adapter Service architecture may integrate adapter layers for multiple NLP tasks into a single instance of a base model to generate a multi-task model that generates NLP predictions for multiple task types. The Adapter Service architecture may also integrate one adapter layer into a single base model instance to generate a single task model. The single task model may dynamically switch between different adapter layers to generate predictions for multiple NLP tasks.

Models trained and inferenced using the Adapter Service architecture not do require maintaining full model files for each type of NLP task. The Adapter Service architecture also reduces the processing resources and time required to switch between model files. By allowing the ML system 130 to serve multiple models at scale within a single deployment, while processing a high volume of requests for each different NLP task, the Adapter Service architecture may reduce the cost of operating a NLP system capable of processing a wide variety of NLP tasks. Additionally, by modifying the same base model with adapter layers for each NLP task type, the Adapter Service architecture may insure the same core computational infrastructure is used for every NLP task request regardless of the NLP task type included in the request. The Adapter Service architecture described may thereby improve the efficiency of machine learning systems serving NLP predictions at scale by decreasing the amount of system down time and reducing the number of hours the system operates below capacity. The Adapter Service architecture may also more efficiently modify processing, memory, and network resources in response to changes in demand for predictions generated by different NLP models.

In various embodiments, the base model 220 may be a language representation model. In one embodiment, the base model 220 may be a Bidirectional Encoder Representations from Transformers (BERT) model. The base model 220 may process text using a transformer (i.e., an attention mechanism that learns contextual relations between words and/or sub-words in a text sequence). The transformer may process text to aggregate language modeling knowledge in the base model 220. Language modeling knowledge may include, for example, insights about the meaning of words, structure of text, context provided by neighboring words, and the like. The base model 220 may leverage language modeling knowledge to perform a wide variety of NLP tasks including sentence classification, missing word prediction, and the like. The language modeling knowledge of the base model 220 may also be used to construct a generalizable language representation that may be augmented and/or refined during a tuning process to generate a fine-tuned model. The fine-tuned model may be specific to a particular category of NLP task (e.g., sentiment analysis, topic and intent classification, named entity recognition, and the like).

The transformer of the base model 220 may include various distinct components, for example, a tokenizer that converts the text input into contextual embedding vectors, an encoder that turns the contextual embedding vectors into a language representation, and a task specific output layer 230 that produces a prediction for a particular task. In various embodiments, the base model 220 may only generate a language representation model, therefore, the task specific output 230 mechanism may be unnecessary for the base model. Task specific output layers 230 for a particular NLP task may be included in the one or more model artifacts 242 provided by the model deployment service 240.

The input into the base model 220 may include individual words, word embeddings, word position data, phrases, sentences, sentence pairs, and other snippets of text, word meanings, and/or text structure data. The input text is broken down into a sequence of tokens using a tokenization process. The output of the tokenization is a sequence of words or subwords, each of which is mapped to a high dimension embedding vector using pre-trained embedding models such as WordPiece embedding or SentencePiece embedding. The output of the tokenization process is a sequence of embedding vectors that are stacked together to form a multidimensional tensor that forms the input of the encoder stack.

The encoder's language modeling representations may be learned via a self-supervised language modeling task. For example, the base parameters may be trained to predict the value of a masked word in a sequence based on the context provided by the words around the masked word. The base parameters may also be trained to predict the second sentence of a sentence pair. In various embodiments, the encoder 222 may be combined with task specific output layers 230 to form a base model 220 for generating one or more NLP predictions. The base model 220 may include a plurality of base parameters that may be trained on a particular task. To improve the accuracy of specific NLP predictions, the base model 220 may be modified by incorporating one or more model artifacts 242.

As shown in FIG. 3, a task specific model artifact 242 may include one or more adapter layers 226 and a task specific output layer 230. Each model artifact 242 may be specific to a particular machine learning task. For example, "Model Artifact ML Task 1" may include adapter layers 226a and a output layer 230a for performing sentiment analysis, "Model Artifact ML Task 2" may include adapter layers 226b and a task specific output layer 230b for performing document classification tasks, "Model Artifact ML Task N" may include adapter layers 226n and an output layer 230n for performing named entity recognition, and the like. In various embodiments, the one or more adapter layers 226 may be encoder layers that encode NLP task specific features as vectors for processing by the neural network of the single task fine-tuned model 250 and/or multi-task fine-tuned model 252.

In various embodiments, the one or more adapter layers 226 may be simple skip-connection bottleneck layers that may alter the flow of data within the base model. For example, the one or more adapter layers 226 may alter the learned manifold from the base model 220 to generate a single task fine-tuned model 250 and/or multi-task fine-tuned model 252 that performs a particular NLP task. The learned manifold may be a particular language representation generated by the base model 220. Incorporating one or more adapter layers 226 into the base model 220 may alter the learned manifold by changing the flow of data through the model. Adapter parameters included in the one or more adapter layers 226 may introduce, eliminate, and/or rearrange data points included in the learned manifold by adding additional weights and/or modifying weights provided by the base parameters. By adapting the learned manifold to fit a dataset specific to one or more specific NLP tasks, the one or more adapter layers 226 tune the base model 220 to generate a fine-tuned model that performs one or more particular NLP tasks.

The task specific output layer 230 included in a model artifact 242 may include one or more output layers that transform the vector outputs provided by the encoder 220 into an NLP prediction. For example, the task specific output layer 230 may include a feed-forward neural network configured to ingest the vectors generated by the encoder and apply one or more functions and/or operations to the vector data to generate raw probabilities for a particular NLP prediction. A softmax layer included in the task specific output layer 230 then generates a normalized NLP prediction based on output from the penultimate layer.

In various embodiments, the output layer 230 and the one or more adapter layers 226 include a plurality of adapter parameters. The adapter parameters may fine-tune the base model 220 to generate a single task fine-tuned model 250 and/or multi-task fine-tuned model 252 optimized for performing one or more specific NLP tasks. Integrating the adapter parameters into the base model 220 transfers knowledge captured in the base model parameters to the fine-tuned models. The adapter parameters may then augment the knowledge provided by base parameters to optimize the fine-tuned models for a particular NLP task. For example, the adapter parameters may change the learned manifold of the base model 220 to fit a dataset for a particular NLP task. To provide models that generate predictions for a variety of NLP tasks, the Adapter Service architecture may transform the same base model 220 instance into a variety of single task fine-tuned models 250 and/or multi-task fine-tuned models 252. Adapting the same base model 220 to a variety of NLP tasks allows the disclosed ML system 130 to significantly reduce the amount of resources required to perform multi-task NLP predictions at scale by enabling one ML system 130 deployment to efficiently generate models for multiple tasks.

As shown in FIG. 3, the ML system 130 includes a model deployment service 240 that facilitates switching between multiple NLP tasks within one deployment by loading and exchanging model artifacts 242 at run time. In various embodiments, model artifacts 242 may be persisted in a database hosted on a database server. At runtime, the model deployment service 240 may process an NLP request including input text and an NLP task identifier. The model deployment service 240 may then fetch the appropriate model artifact 242 from the database and load the adapter layers 226 and/or output layer 230 into their appropriate positions. To process an NLP request having a different NLP task identifier, the model deployment service 240 may exchange a first model artifact with a second model artifact. In various embodiments, the exchange occurs by removing the adapter layers and/or output layer for the first model artifact from the base model and inserting the adapter layers and/or output layer for the second model artifact into their appropriate positions within the base model. Once the second model artifact is loaded, the fine-tuned model generated using the second model artifact may generate a prediction for the new NLP request type. To process an NLP request with multiple NLP task identifiers, the model deployment service can load multiple model artifacts at once and generate multiple NLP predictions by processing the input through multiple adapter layers and output layers in parallel.

In the one-task one-model paradigm, model artifacts are often too large to be cached. Therefore, ML systems having one monolithic base model for each NLP task experience long load times that cannot be substantially improved using cache or other high speed memory. To improve performance and reduce model artifact loading times, the model deployment service 240 may load one or more frequently used model artifacts 242, adapter layers 226a-n, task specific output layers 230a-n, and/or adapter parameters in cache memory or other high speed memory. The one or more model artifacts 242, adapter layers 226a-n, output layers 230a-n, and/or adapter parameters may be cached dynamically according to system needs and/or automatically upon system boot-up, restart, or some other triggering event. By reducing the amount of parameters required to generate a fine-tuned model for each NLP task, the Adapter Service architecture described herein leads to a 50 to 100 fold reduction in model artifact size per incremental task. Model artifacts of this size may be readily loaded into cache memory so they will be available immediately, thereby reducing load times and improving performance of the ML system 130.

The model deployment service 240 may load adapter layers 226a-n and/or output layers 230a-n at various positions within the base model 220. For example, the adapter layers 226a-n may be positioned within the encoder 222 stack of the base model 220 between one or more base layers 224. Adapter layers 226a-n may also be loaded into one or more hidden layers within one or more of the base layers 224. The placement of adapter layers 226a-n allows the vector outputs calculated by the base layers 224 to be adjusted at each layer by an adapter layer 226a-n which performs one or more additional transformations. The adapter layers 226a-n may be placed between any components of the base model 220. For each fine-tuned model, the location of the adapter layers 226a-n within the base model may be empirically or heuristically determined to adjust the vector outputs calculated by the base network as required to perform a particular NLP task with high accuracy and without inflating the number of model parameters.

As shown in FIG. 4A, at runtime, the ML system 130 receives input data 210 including input text and an NLP task identifier identifying an NLP task type. The NLP task identifier may specify one or more target NLP task types to be performed on the input text. The NLP task identifier is routed to the model deployment service 240 which processes the NLP task identifier, fetches the model artifact 242 corresponding to the NLP task identifier, and loads the model artifact 242 into the appropriate position within the base model 220 to generate a single task fine-tuned model 250. The input text included in input data 210 is then processed by the single task fine-tuned model 250. In various embodiments, the input data 210 is tokenized into a sequence of tokens and turned into a sequence of embedding vectors by a pre-trained embedding model to generate a multidimensional tensor input. This tensor is processed by all the base layers 224 and the adapter layers 226a of the encoder 222 to generate an output tensor. The output tensor is then processed by the output layer (if applicable) 230a to generate a prediction 164. The prediction may be distributed to an NLP application by displaying the prediction 164 directly and/or using the prediction 164 to provide NLP functionality.

As shown in FIG. 4B, at runtime, the ML system 130 receives input data 210 including input text and multiple NLP task identifiers. The NLP task identifiers are routed to the model deployment service 240 which processes the NLP task identifiers to extract the NLP task types, fetch the model artifacts 242 corresponding to each NLP task type, and load the model artifacts 242 into the appropriate position within the base model 220 to generate a multi-task fine-tuned model 252. In various embodiments, the input data 210 is tokenized into a sequence of tokens and tuned into a sequence of embedding vectors by a pre-trained embedding model to generate a multidimensional tenser input. This tensor is processed by all the base layers 224 and the adapter layers 226*a-n* of the encoder 222 to generate an output tensor. The output tensor is then processed by the output layer (if applicable) 230*a-n* to generate a prediction 164. In various embodiments, input data corresponding to a particular NLP task type may be processed by the adapter layers 226*a-n* and/or output layer 230*a-n* corresponding to the particular NLP task type. For example, the input data including NLP task identifiers having a "ML task 1" and "ML task n" task type may have the output tensors corresponding to a "task 1" task type processed by the base layers 224, adapter layers 226*a*, and output layer 230*a* corresponding to "task 1". The output tensors corresponding to the "task n" task type may be processed by the base layers 224 and the adapter layers 226*n* and output layers 230*n* corresponding to "task n". By incorporating two or more model artifacts 242 into the base model 230, the multi-task fine-tuned model 252 may be used for multi-headed inference to generate predictions for multiple NLP tasks in parallel.

Figure 5:
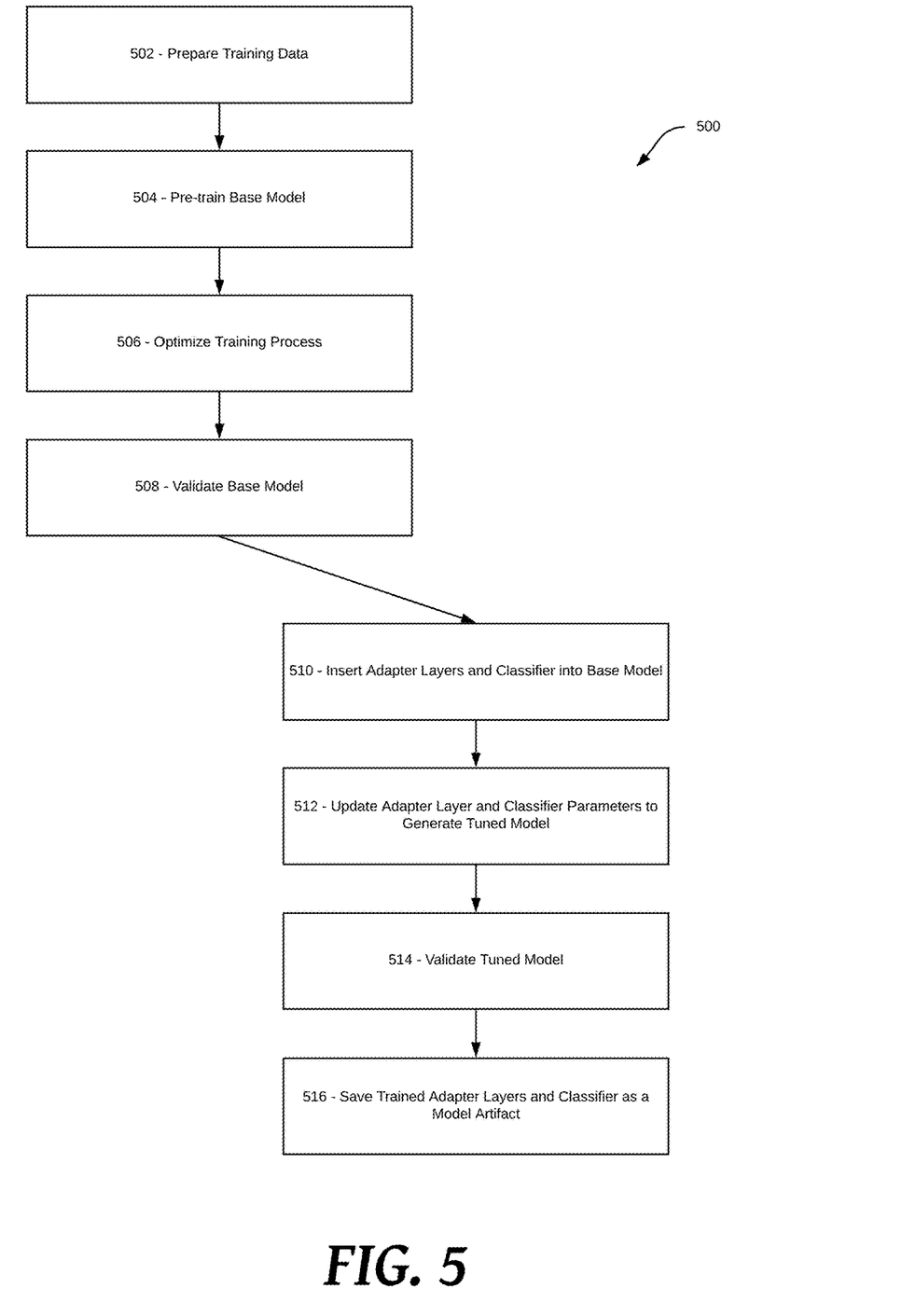
FIG. 5 is a flow chart illustrating a method of training the machine learning system shown in FIGS. 2-4B.

FIG. 5 illustrates an exemplary training method 500 that may be performed by the ML system 130 according to an embodiment of the present disclosure. The training method 500 may be used to update adapter parameter sets to generate model artifacts optimized for a particular NLP task. In various embodiments, adapter parameters are trained by inserting the untrained adapter layers and output layer into the base model, freezing the base model weights, and training only the adapter parameters. Optionally, the base model can be trained separately if no appropriate pre-trained base model exists. As shown in FIG. 5, 502-508 describe training the base parameters of the base model and 510-516 describe training the adapter parameters of the adapter layers and/or output layer.

At 502, the ML system 130 prepares training data. Training data may include any text data in any language. Text data for training datasets may be extracted from a corpus of documents. In various embodiments, training data may be assembled using text data included in a text corpus, for example, the BooksCorpus including 800M words, English Wikipedia including 2,500M words, WMT 2014 English-German dataset including 4.5M sentence pairs, the WMT 2014 English-French dataset including 36M sentences, and the like. Tokens may be generated using a tokenization process and/or other pre-processing operations.

In various embodiments, tokens may include one or more of individual words word sub-segments, or similar atomic unit of sequential information. During tokenization, one or more operations may be executed on text data to truncate, group, combine, and otherwise manipulate the text data into tokens. The tokens and/or training data may depend on the training task used to train the base model. For example, training data used for a training task that generates a model that predicts words may include word tokens. Training data used for a training task that generates a model that predicts and/or classifies sentences may include sentence tokens and target sentence classes.

At 504, the encoder layers of the base model process training data to pre-train the base model's base parameters. In various embodiments, the base parameters include vector outputs generated by the encoder layers. During training, base parameters included in the base model may generate predictions for one or more training tasks based on the tokens included in the training data. Once the initial base parameters are established, the base parameters may be refined during one or more training cycles to improve performance of the model. The base parameters may be refined by determining an update for the base parameters that reduces the loss function for the one or more training tasks. The update may then be applied to the base parameters to improve performance of the base model for the one or more training tasks. Post training, the base parameters generated by the encoder may be fed into one or more classification layers to perform an NLP task on input data. The classification layers may also include one or more trainable base parameters that may be updated to minimize a loss/cost function. In various embodiments, the base parameters are generated using a training process that is specific to one or more training tasks (e.g., word prediction, word classification, document classification, and the like). One or more different training tasks may be used to generate base parameters for a base model.

In various embodiments, base parameters included in the base model may be generated using multiple training tasks. For example, one training task may include missing word prediction (i.e., unsupervised language modeling) and another training task might be to generate word classes. During training, multiple tasks may be performed together with the goal of minimizing a combined loss function. The combined loss function may combine errors from the objective function for each training task. By minimizing the combined loss function, the base model can be trained to maximize performance on two or more training tasks.

An exemplary first training task may train the base model using an objective function that predicts the original identity of masked words. For this setup, a small portion (e.g., 15%) of the tokens included in the training data may be masked either statically before being input into the encoder or dynamically while a batch of training data is loaded. To generate the word prediction, the base model may be trained to understand the context of the masked words based on the words in the text sequence surrounding the masked words. Word context may be incorporated into training data by adding a positional embedding indicating the position of the word within its text to each word token. The positional embedding may be based on sinusoidal functions that are computed for each token. Once calculated, the positional embedding for each token is added to the token's input vector.

The task specific output layer may generate a prediction by computing the dot product between the final output matrix generated by the encoder with its weight matrix, adding its bias vector, and passing the output through an activation function to transform the vector values to word values. One dimension of the output matrix corresponds to individual input tokens. The other dimension of the output matrix corresponds to either the output class probability of the output layer when the output layer is included in the training or the class probability of the target token when the output layer is not included in the training.

An exemplary second training task may train the base model using an objective function that solves a sentence prediction problem. To solve the sentence prediction problem, the base model may predict if the second sentence in a two sentence pair is the subsequent sentence in an original document or if the second sentence is a random sentence. To generate the sentence prediction, the base model may consider the context of the words in the target sentence based on the words surrounding the target sequence. Sentence context and text structure may be incorporated into the training data by adding one or more embeddings to each token. For example, a sentence embedding may be added to each token indicating whether the word corresponding to the token appears in sentence A or sentence B of a two sentence pair. Additional training tasks using a variety of other objective functions for language modeling may be used to train the base model.

In various embodiments, the training tasks performed by the base model may be performed together with the goal of minimizing the combined loss function for the two tasks. At 506, the training process may be optimized to improve the accuracy of the predictions generated by the base model, reduce training time, reduce the amount of resources consumed during training, and the like. In various embodiments, one or more hyper parameters including training data batch size, learning rate, training cycles, training time, number of training tasks, type of training task, and the like may be modified to optimize the training process. At 508, post training, performance of the base model may be validated by generating one or more predictions using new input data. The new input data used for validation should not be included in the training data. In various embodiments, the NLP task or prediction used for validation may be the same or different from the one or more training tasks and/or predictions used during training.

Inserting one or more adapter layers into the base model can transform the base model into a fine-tuned model specialized to perform a specific NLP task. To generate a fine-tuned model the adapter parameters of the adapter layers must be trained. An example of training adapter parameters is described at 510-516. Training data for generating the adapter parameters of the fine-tuned model may be different from and/or the same as training data used to generate the base model parameters. In various embodiments, training data for generating the adapter parameters may be prepared by tokenizing one or more corpora of text data to generate a plurality of tokens. The one or more corpora of text data may be specific to the training task and type of NLP prediction generated by the fine-tuned model. For example, training data for generating the adapter parameters for a sentiment analysis fine-tuned model may be prepared using one or more corpora of product reviews having a range of sentiments.

At 510, adapter layers are inserted into the base model. In various embodiments, the adapter layers may be simple skip-connection bottleneck layers. One or more output layers may also be incorporated into the base model in order to generate a fine-tuned model. In various embodiments, the output layer may include one or more classification layers that may transform vector data output by the encoder into a form that may be input into a softmax layer that generates a prediction. For example, an output layer may multiply output vectors by its weight matrix to transform the encoder output matrix into a matrix with an output size equivalent to that of the input sequence of tokens by the number of output classes in the prediction tasks. A softmax layer may then generate a prediction by transforming the output matrix into the probability of each prediction outcome for the specific NLP task and selecting the outcome with the highest probability.

Once the adapter layers and/or output layer is incorporated into the base model, the adapter parameters of the adapter layers and/or task specific output layer are trained. For training a fine-tuned model, a training task that corresponds to the NLP task of the fine-tuned model is selected. For example, a document classification training task is selected for training a fine-tuned model that generates document classification predictions. During the training phase, the base parameters are frozen. Only the adapter parameters are updated during the adapter training phase to minimize task specific loss. To improve the performance of the fine-tuned model, the adapter parameters may be updated using a gradient descent algorithm which incrementally adjusts the values of the adapter parameters along the direction of maximum training loss until the optimal value of the loss is empirically detected.

To reduce the training time and/or accelerate the efficiency of the optimization process, a stochastic gradient descent variant may be used. Stochastic gradient descent approximates the gradient based on the objective function computed on a small subset of the training data instead of the actual gradient computed on the entire training dataset. The training process may be further optimized by modifying one or more hyper parameters including training data batch size, learning rate, training cycles, training time, number of training tasks, type of training task, and the like.

By training adapter parameters separately from base parameters, the disclosed Adapter Service architecture significantly reduces the number of tunable parameters required to generate a fine-tuned multi-task NLP model per incremental prediction task. In various embodiments, the number of tunable parameters included in the adapter parameter set is more than 1000× fewer than the number of tunable parameters included in the base parameter set or fully fine-tuned NLP model parameter sets. The reduced number of tunable parameters in the adapter parameter set relative to the base parameter set results in a significantly smaller model artifact size. In various embodiments, the size of a model artifact including adapter layers, an output layer, and/or adapter parameters is at least 80× or 100× smaller (e.g., 1 MB or 10 MB) than the size of a model artifact including a full base model. The reduced number of tunable parameters reduces the amount of training time required to generate a fine-tuned NLP model per incremental prediction task. In various embodiments, the training time required to update adapter parameters is 20× to 100× smaller (i.e., minutes or hours) than the training time required to update the base parameters or fine-tuned full NLP model parameters (i.e., days).

After training the adapter parameters, the fine-tuned model may be validated at 514. In various embodiments, the performance of the fine-tuned model may be validated by generating one or more predictions using new input data. The new input data used for validation should not be included in the training data used to train the fine-tuned model. In various embodiments, the prediction used for validation may be the same or different from the training task and/or predictions used during training. At 516, the adapter layers and/or output layer included in the fine-tuned model are separated from the base model and can be stored as a model artifact that may be dynamically loaded into the base model and exchanged with other model artifacts. To generate model artifacts for specific NLP tasks, 510-516 may be repeated to train a set of adapter parameters for each NLP task performed by the ML system.

Figure 6:
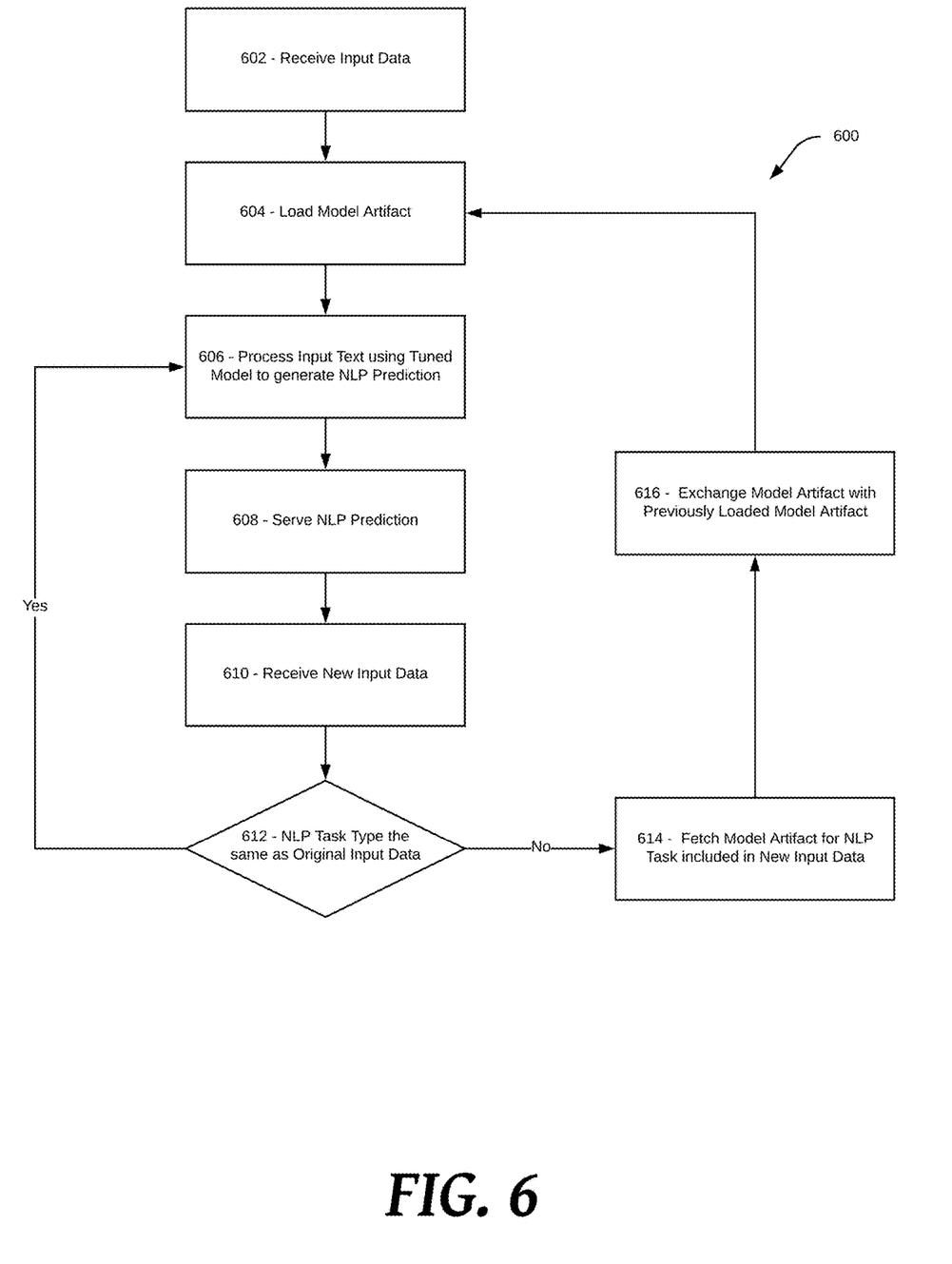
FIG. 6 is a flow chart illustrating a method for generating NLP predictions using the machine learning system shown in FIGS. 2-4B.

At runtime, the ML system may dynamically adapt the base model based on input data to generate one or more fine-tuned models. Each fine-tuned model may perform one or more specific NLP tasks specified in the input data. Dynamically adapting the same base model instance at runtime, allows a single deployment of the ML system to serve multiple model predictions across a wide variety of NLP tasks. FIG. 6 illustrates an example of generating NLP predictions at runtime 600. At 602, the ML system receives input data. Input data may include a payload comprising input text, an NLP task identifier, and/or the model artifact location corresponding to the model artifact for the specified NLP task identifier. The NLP task identifier may define an NLP task type that specifies one or more target NLP task types to be performed on the input text. For example, an NLP task type may specify a named entity recognition task to be performed on text data from a document, a sentiment classification task to be performed on a product review, a topic classification task to be performed on a user message, and the like. The input data may also include the location of a model artifact corresponding to the NLP task type included in the NLP task identifier. For example, the location of the model artifact within a cloud storage database (e.g., Amazon S3), a local computer, or other storage resource.

The artifact location for each NLP task may be transferred to a service deployment within the ML system (e.g., a model deployment service) to fetch the appropriate model artifact. At 604, the model deployment service loads the model artifact into its proper location within the base model architecture to generate a fine-tuned model. In various embodiments, the trained parameters of the adapter layers and/or output layer included in the model artifact are cached during the loading process. In various embodiments, model artifacts may include adapter layers and/or output layers for two or more NLP tasks. More than one model artifact may also be loaded into the base model architecture at 604 to generate a multi-task fine-tuned model.

At 606, the fine-tuned model processes the input text using a tokenizer. In various embodiments, input text is processed using a combination of the base model parameters and the cached parameters of the model artifact specified by the fine-tuned model. NLP predictions generated by the fine-tuned model are then distributed to an NLP application at 608. In various embodiments, the NLP predictions generated by the fine-tuned model may be delivered directly to an NLP application and/or incorporated into NLP functionality provided by an application. For example, named entity recognition predictions for input text may be displayed directly to the user of an NLP application within a UI. Topic classification predictions for an input text may also be used to generate a response message as part of a chat bot or other conversational AI functionality provided by the NLP application.

At 610, the ML system receives new input data. The new input data may include a payload comprising input text, and NLP task identifier, and the model artifact location corresponding to the model artifact for the specified NLP task. The NLP task identifier may define an NLP task type that specifies one or more target NLP task types to be performed on the input text. The new input data may be received from the same application instance as the input data in 602. The ML system may have an endpoint and/or access location that is known by a plurality of application instances, therefore, the new input data may also be from a different application. The NLP task type and the model artifact location are then provided to the model deployment service.

At 612, if the NLP task type and/or the model artifact location included in the new input data are the same as the NLP task type and/or the model artifact location specified in the input data received at 602, the same fine-tuned model may be used to process the input text included in the new input data to generate a prediction. In this case, the prediction for the new input data is generated by repeating 606. The prediction is then distributed to an application instance at 608 and the system waits for new input data received at 610.

At 612, if the NLP task type or the model artifact location included in the new input data is different from the NLP task type or model artifact location specified in the input data received at 602, the base model must be adapted for the new NLP task. In various embodiments, the model deployment service adapts the base model by fetching one or more model artifacts at the model artifact location(s) specified in the new input data at 614. The new model artifacts are then exchanged with the previous model artifacts by removing the previous model artifacts and integrating the new model artifacts into the base model at 616. To facilitate a dynamic exchange of model artifacts in real-time, one or more parameters of the adapter layers and/or task specific output layer included in the new model artifact may be pre-loaded into cache memory or other high speed memory.

In various embodiments, to exchange model artifacts, adapter layers and/or task specific output layers included in the original model artifact must be removed from the base model. Adapter layers and/or output layers from the new model artifact are then inserted into their proper location within the base model architecture. In various embodiments, the position of the adapter layers and/or output layers within the base model architecture may be different for each fine-tuned model. For example, to generate a fine-tuned model for a first NLP task, adapter layers and a task specific output layer may be added on top of the base model encoder output. To generate a fine-tuned model for a second NLP task, adapter layers may be added to the base model encoder to incorporate one or more learned adapter parameters into the encoder output. To generate a fine-tuned model for a third NLP task, one or more adapter layers may be placed between one or more base model encoder layers to alter the learned manifold within the encoder.

The number, type, and/or function of the adapter layers and/or output layers included in the model artifact may also depend on the specific NLP task performed. In various embodiments, one or more trained, task specific output layer and/or softmax layers may be included in the output layers to generate different NLP predictions based on the encoder's output. For example, to generate a sentence classification prediction, a task specific output layer having one or more classification layers trained on sentence classification tasks may be included in the fine-tuned model for sentence classification. To generate a named entity recognition prediction, a task specific output layer having one or more classification layers trained on named entity recognition tasks may be included in the fine-tuned model for named entity recognition.

After inserting the adapter layers and/or output layer included in the new model artifact within the original model artifact, the new model artifact is loaded into memory at 604 to generate the fine-tuned model. In various embodiments, the trained parameters of the adapter layers and/or output layer included in the new model artifact may be cached during the loading process to improve performance of the base model adaptation process. At 606, the fine-tuned model then processes the input text received in the new input data to generate a prediction. The prediction is then served to an application instance at 608 and the ML system waits to receive new input data at 610.

FIG. 7 shows a computing device according to an embodiment of the present disclosure. For example, computing device 700 may function as client 160 (which may include a system for serving NLP predictions 100; one or more servers or other devices configured to provide a system for serving NLP predictions 100 and/or an ML system 130; or a portion or combination thereof). The computing device 700 may be implemented on any electronic device that runs software applications derived from compiled instructions, including without limitation personal computers, servers, smart phones, media players, electronic tablets, game consoles, email devices, etc. In some implementations, the computing device 700 may include one or more processors 702, one or more input devices 704, one or more display devices 706, one or more network interfaces 708, and one or more computer-readable mediums 712. Each of these components may be coupled by bus 710, and in some embodiments, these components may be distributed among multiple physical locations and coupled by a network.

Display device 706 may be any known display technology, including but not limited to display devices using Liquid Crystal Display (LCD) or Light Emitting Diode (LED) technology. Processor(s) 702 may use any known processor technology, including but not limited to graphics processors and multi-core processors. Input device 704 may be any known input device technology, including but not limited to a keyboard (including a virtual keyboard), mouse, track ball, camera, and touch-sensitive pad or display. Bus 710 may be any known internal or external bus technology, including but not limited to ISA, EISA, PCI, PCI Express, NuBus, USB, Serial ATA or FireWire. Computer-readable medium 712 may be any medium that participates in providing instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 712 may include various instructions 714 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 704; sending output to display device 706; keeping track of files and directories on computer-readable medium 712; controlling peripheral devices (e.g., disk drives, printers, etc.) which can be controlled directly or through an I/O controller; and managing traffic on bus 710. Network communications instructions 716 may establish and maintain network connections (e.g., software for implementing communication protocols, such as TCP/IP, HTTP, Ethernet, telephony, etc.).

OCR system instructions 718 may include instructions that enable computing device 700 to function as an OCR system and/or to provide OCR system functionality (e.g., generating training data) as described herein. ML system instructions 720 may include instructions that enable computing device 700 to function as ML system 130 and/or to provide ML system 130 functionality as described herein. Routing system instructions 722 may include instructions that enable computing device 700 to function as a routing system and/or to provide prediction routing functionality as described herein.

Application(s) 724 may be an application that uses or implements the processes described herein and/or other processes. For example, and NLP application 150 that provides NLP functionality. The processes may also be implemented in operating system 714. For example, application 724 and/or operating system 714 may present UIs 162 including predictions 164 which may include results from NLP prediction tasks as described herein.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed are:

1. A method for providing a variety of natural language processing (NLP) models during runtime, comprising:
   receiving a first input data comprising a first input text and a first task type, the first task type specifying one or more target NLP task types to be performed on the first input text;
   dynamically generating a first model tuned to generate predictions for a first NLP task having the first task type, the generating comprising integrating, into a base model during runtime, a first model artifact comprising one or more adapter layers specific to the first task type;
   generating, during the same runtime and based on processing the first input text with the first model generated during the same runtime, a prediction for the first NLP task;
   providing the prediction to one or more application instances,
   receiving a second input data comprising a second input text and a second task type, the second task type specifying one or more target NLP task types to be performed on the second input text, wherein the second task type is different from the first task type;
   generating, during the same runtime, a second model tuned to generate predictions for a second NLP task having the second task type, the generating comprising dynamically exchanging the first model artifact with a second model artifact comprising one or more adapter layers specific to the second task type;
   generating, during the same runtime, a second prediction for the second NLP task by processing the second input text using the second model; and
   distributing the second prediction to the one or more application instances.

2. The method of claim 1, wherein the base model comprises one or more encoder layers that process training data to generate base parameters.

3. The method of claim 2, further comprising:
   training the base parameters, the training comprising:
   tokenizing one or more corpora of text data to generate a plurality of tokens;
   generating predictions for a first training task and a second training task based on the plurality of tokens;
   determining an update for the base parameters; and
   applying the update to the base parameters.

4. The method of claim 2, wherein the base parameters of the base model include transfer knowledge generalizable to a variety of NLP tasks to the first model.

5. The method of claim 2, wherein the integrating of the first model artifact comprises inserting the one or more adapter layers into the encoder layers to alter a flow of data within the base model; and
   wherein the first model artifact comprises an output layer that generates the prediction for the first NLP task based on an output received from the one or more adapter layers.

6. The method of claim 2, wherein the first model artifact comprises adapter parameters comprising knowledge related to a particular NLP task.

7. The method of claim 6, further comprising:
   training the adapter parameters, the training comprising:
   tokenizing one or more corpora of text data to generate a plurality of tokens;
   combining the first model artifact with the base model by inserting the one or more adapter layers within the base model's architecture;
   freezing the base parameters included in the base model;
   generating predictions for a training task based on the plurality of tokens, wherein the training task has the same task type as the first NLP task;
   determining an update for the adapter parameters;
   applying the update to the adapter parameters; and
   storing the adapter parameters in the first model artifact.

8. The method of claim 6, wherein the adapter parameters comprise a smaller number of tunable parameters relative to the base parameters, and wherein the adapter parameters require less training time relative to the base parameters.

9. The method of claim 1, wherein the one or more adapter layers include skip-connection bottleneck layers that alter a learned manifold within the base model.

10. The method of claim 1, wherein the exchanging comprises:
    fetching the second model artifact;

removing the one or more adapter layers specific to the first NLP task from the base model; and inserting one or more adapter layers specific to the second NLP task into the base model.

11. A machine learning (ML) system for serving a variety of NLP models comprising:

a memory; and a processor in communication with the memory and configured to perform at least the following functions:

training a base model;

generating a plurality of model artifacts, wherein each model artifact comprises adapter parameters;

receiving a first input data comprising a first input text and a first task type, the first task type specifying a category of NLP tasks to be performed on the first input text;

dynamically generating a first model tuned to generate predictions for a first NLP task having the first task type, the generating comprising integrating, into the base model during runtime, a first model artifact comprising one or more adapter layers specific to the first task type;

generating, during the same runtime and based on processing the first input text with the first model generated during the same runtime, a prediction for the first NLP task;

providing the prediction to one or more application instances, receiving a second input data comprising a second input text and a second task type, the second task type specifying one or more target NLP task types to be performed on the second input text, wherein the second task type is different from the first task type;

generating, during the same runtime, a second model tuned to generate predictions for a second NLP task having the second task type, the generating comprising dynamically exchanging the first model artifact with a second model artifact comprising one or more adapter layers specific to the second task type;

generating, during the same runtime, a second prediction for the second NLP task by processing the second input text using the second model; and distributing the second prediction to the one or more application instances.

12. The system of claim 11, wherein the exchanging comprises:

fetching the second model artifact;

removing the one or more adapter layers specific to the first NLP task from the base model; and inserting one or more adapter layers specific to the second NLP task into the base model.

13. The system of claim 11, wherein the ML system comprises an Adapter Service architecture that generates a plurality of models by integrating different model artifacts into a single instance of the base model, wherein each model included in the plurality of models generates predictions for a different NLP task.

14. The system of claim 13, wherein the Adapter Service architecture includes a model deployment service that facilitates integrating the different model artifacts into the base model.

15. The system of claim 14, wherein the model deployment service generates predictions for a variety of NLP tasks by serving the plurality of models on demand.

16. The system of claim 11, wherein the first model artifact includes an output layer that receives the output of the one or more adapter layers as an input and generates the prediction for the first NLP task as an output.

17. A method for providing a variety of natural language processing (NLP) models during runtime, comprising:

training a base model comprising base parameters, the training comprising:

tokenizing one or more corpora of text data to generate a plurality of tokens;

generating predictions for a first training task and a second training task based on the plurality of tokens;

determining an update for the base parameters, wherein applying the update to the base parameters reduces a combined loss function for the first training task and the second training task; and applying the update to the base parameters;

training, during runtime, one or more adapter layers comprising adapter parameters, wherein the one or more adapter layers are specific to an NLP task type, the training one or more adapter layers comprising:

inserting, during the same runtime, the one or more adapter layers into their correct position within the base model's architecture;

freezing, during the same runtime, the base parameters;

generating, during the same runtime, predictions for a third training task having the NLP task type specific to the one or more adapter layers inserted during the same runtime;

determining, during the same runtime, an update for the adapter parameters, wherein applying the update to the adapter parameters reduces a loss function for the third training task;

applying, during the same runtime, the update to the adapter parameters; and using, during the same runtime, the updated adapter parameters for a prediction, the prediction further comprising:

generating, during the same runtime, a prediction for a first NLP task having a first type using a first model having a first model artifact; and generating, during the same runtime, a a prediction for a second NLP task having a second type using a second model having a second model artifact, the second model being generated by dynamically exchanging the first model artifact with the second model artifact.

18. The method of claim 17, further comprising:

receiving a first input data comprising a first input text and the first task type, the first task type specifying a category of NLP tasks to be performed on the first input text, wherein the first task type specifies the NLP task type specific to the one or more adapter layers;

generating the first model tuned to generate predictions for the first NLP task having the first task type, the generating comprising integrating, into the base model, the first model artifact comprising one or more adapter layers specific to the first task type;

generating, based on processing the first input text with the first model, the prediction for the first NLP task; and providing the prediction to one or more application instances.

* * * * *